United States Patent
Smith et al.

(10) Patent No.: US 9,765,631 B2
(45) Date of Patent: Sep. 19, 2017

(54) STRUCTURAL CONFIGURATIONS AND COOLING CIRCUITS IN TURBINE BLADES

(71) Applicant: General Electric Company, Schenectady, NY (US)

(72) Inventors: Aaron Ezekiel Smith, Simpsonville, SC (US); Stanley Frank Simpson, Simpsonville, SC (US); Lisa Anne Wichmann, Smyrna, GA (US)

(73) Assignee: General Electric Company, Schenectady, NY (US)

( * ) Notice: Subject to any disclaimer, the term of this patent is extended or adjusted under 35 U.S.C. 154(b) by 982 days.

(21) Appl. No.: 14/143,587

(22) Filed: Dec. 30, 2013

(65) Prior Publication Data

US 2015/0184522 A1 Jul. 2, 2015

(51) Int. Cl.
*F01D 5/18* (2006.01)
*B23P 15/04* (2006.01)
*F01D 5/14* (2006.01)
*F01D 5/28* (2006.01)

(52) U.S. Cl.
CPC ............ *F01D 5/187* (2013.01); *F01D 5/147* (2013.01); *F01D 5/188* (2013.01); *F01D 5/284* (2013.01); *B23P 15/04* (2013.01); *F05D 2240/305* (2013.01); *F05D 2240/306* (2013.01); *F05D 2250/71* (2013.01); *F05D 2250/711* (2013.01); *F05D 2250/712* (2013.01); *F05D 2250/713* (2013.01); *F05D 2250/75* (2013.01); *F05D 2260/22141* (2013.01); *F05D 2260/941* (2013.01); *F05D 2300/17* (2013.01); *F05D 2300/20* (2013.01); *Y02T 50/672* (2013.01); *Y02T 50/676* (2013.01); *Y10T 29/49337* (2015.01); *Y10T 29/49341* (2015.01)

(58) Field of Classification Search
CPC .......... F01D 5/187; F01D 5/188; F01D 5/147; F01D 5/284; B23P 15/04
IPC ....................................................... B23P 15/04
See application file for complete search history.

(56) References Cited

U.S. PATENT DOCUMENTS

| | | | | |
|---|---|---|---|---|
| 5,516,260 A | * | 5/1996 | Damlis | F01D 5/189 415/115 |
| 5,762,471 A | * | 6/1998 | Cunha | F01D 5/189 415/115 |
| 7,497,655 B1 | * | 3/2009 | Liang | F01D 5/189 415/1 |
| 7,862,299 B1 | | 1/2011 | Liang | |
| 7,871,246 B2 | * | 1/2011 | Liang | F01D 5/187 416/97 R |
| 7,905,706 B1 | | 3/2011 | Liang | |
| 7,946,815 B2 | * | 5/2011 | Liang | F01D 5/186 416/97 R |
| 8,047,789 B1 | | 11/2011 | Liang | |

(Continued)

*Primary Examiner* — Igor Kershteyn
(74) *Attorney, Agent, or Firm* — Mark E. Henderson; Ernest G. Cusick; Frank A. Landgraff

(57) ABSTRACT

A turbine blade that includes an airfoil defined by a concave shaped pressure side outer wall and a convex shaped suction side outer wall that connect along leading and trailing edges and, therebetween, form a radially extending chamber for receiving the flow of a coolant. The turbine blade may further include a rib configuration that partitions the chamber into radially extending flow passages, and a blade outer shell that defines an outer surface of the airfoil. The rib configuration is a non-integral component to the blade outer shell.

20 Claims, 8 Drawing Sheets

(56) References Cited

U.S. PATENT DOCUMENTS

| | | | |
|---|---|---|---|
| 8,057,183 B1 | 11/2011 | Liang | |
| 8,070,442 B1 | 12/2011 | Liang | |
| 8,147,196 B2 * | 4/2012 | Campbell | F01D 5/187 |
| | | | 415/115 |
| 8,162,617 B1 * | 4/2012 | Davies | F01D 5/147 |
| | | | 416/223 R |
| 8,182,223 B2 * | 5/2012 | Pal | F01D 5/189 |
| | | | 415/115 |
| 8,182,224 B1 | 5/2012 | Liang | |
| 8,251,660 B1 | 8/2012 | Liang | |
| 8,322,988 B1 * | 12/2012 | Downs | F01D 5/147 |
| | | | 416/96 A |
| 2005/0281667 A1 * | 12/2005 | Liang | F01D 5/189 |
| | | | 415/115 |
| 2008/0240919 A1 | 10/2008 | Liang | |
| 2010/0074726 A1 | 3/2010 | Merrill et al. | |
| 2011/0180521 A1 | 7/2011 | Quitter et al. | |

* cited by examiner

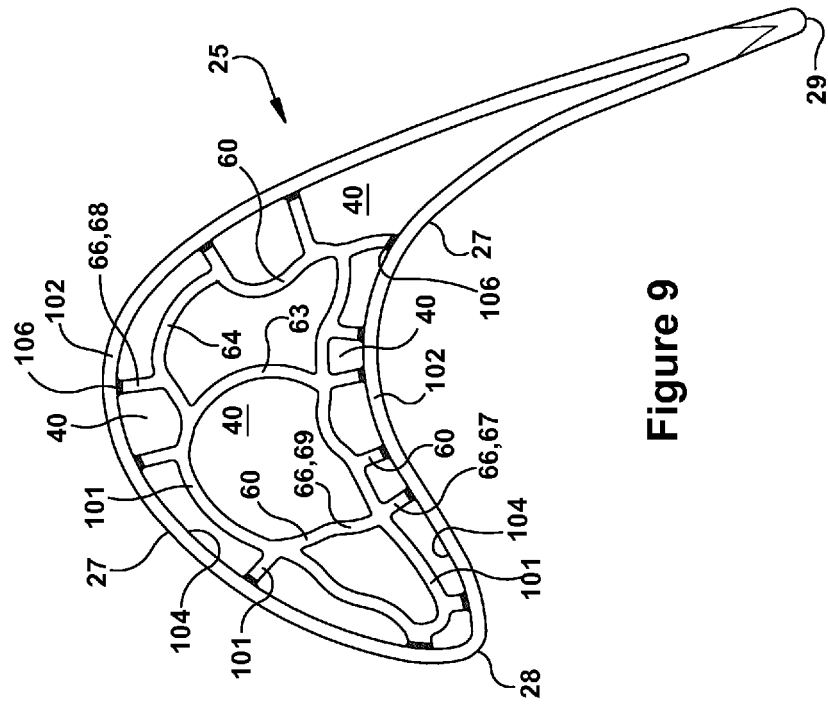
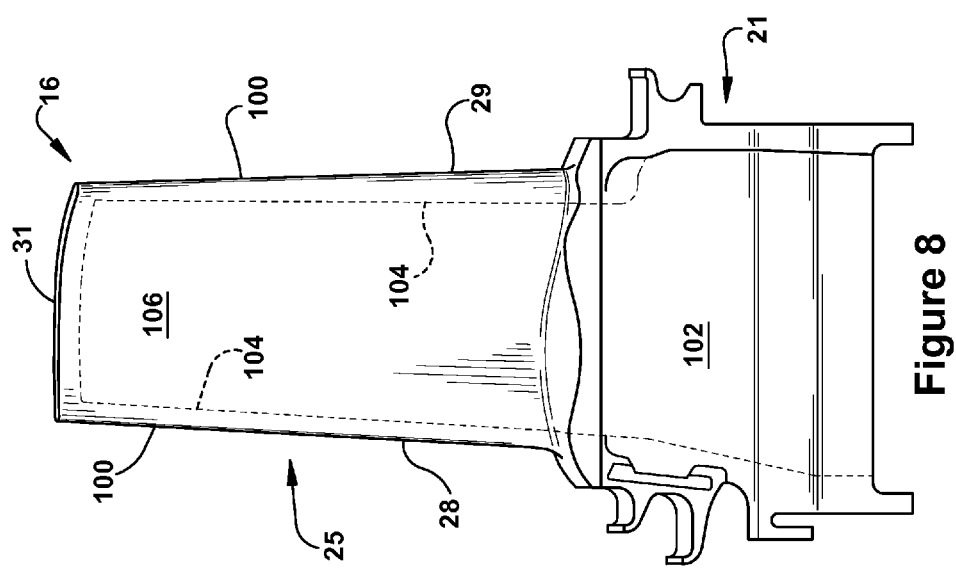
Figure 9
Figure 8

STRUCTURAL CONFIGURATIONS AND COOLING CIRCUITS IN TURBINE BLADES

BACKGROUND OF THE INVENTION

This invention relates to turbine airfoils, and more particularly to hollow turbine airfoils, such as rotor or stator blades, having internal channels for passing fluids such as air to cool the airfoils.

Combustion or gas turbine engines (hereinafter "gas turbines") include a compressor, a combustor, and a turbine. As is well known in the art, air compressed in the compressor is mixed with fuel and ignited in the combustor and then expanded through the turbine to produce power. The components within the turbine, particularly the circumferentially arrayed rotor and stator blades, are subjected to a hostile environment characterized by the extremely high temperatures and pressures of the combustion products that are expended therethrough. In order to withstand the repetitive thermal cycling as well as the extreme temperatures and mechanical stresses of this environment, the airfoils must have a robust structure and be actively cooled.

As will be appreciated, turbine rotor and stator blades often contain internal passageways or circuits that form a cooling system through which a coolant, typically air bled from the compressor, is circulated. Such cooling circuits are typically formed by internal ribs that provide the required structural support for the airfoil, and include multiple flow paths designed to maintain the airfoil within an acceptable temperature profile. The air passing through these cooling circuits often is vented through film cooling apertures formed on the leading edge, trailing edge, suction side, and pressure side of the airfoil.

It will be appreciated that the efficiency of gas turbines increases as firing temperatures rise. Because of this, there is a constant demand for technological advances that enable turbine blades to withstand ever higher temperatures. These advances sometimes include new materials that are capable of withstanding the higher temperatures, but just as often they involve improving the internal configuration of the airfoil so to enhance the blades structure and cooling capabilities. However, because the use of coolant decreases the efficiency of the engine, new arrangements that rely too heavily on increased levels of coolant usage merely trade one inefficiency for another. As a result, there continues to be demand for new airfoil designs that offer internal airfoil configurations and coolant circulation that improves coolant efficiency.

A consideration that further complicates design of internally cooled airfoils is the temperature differential that develops during operation between the airfoils internal and external structure. That is, because they are exposed to the hot gas path, the external walls of the airfoil typically reside at much higher temperatures during operation than many of the internal ribs, which, for example, may have coolant flowing through passageways defined to each side of them. In fact, a common airfoil configuration includes a "four-wall" arrangement in which lengthy inner ribs run parallel to the pressure and suction side outer walls. It is known that high cooling efficiency can be achieved by the near-wall flow passages that are formed in the four-wall arrangement, however, the outer walls experience a significantly greater level of thermal expansion than the inner walls. This imbalanced growth causes stress to develop at the points at which the inner ribs and outer walls connect, which may cause low cyclic fatigue that can shorten the life of the blade. As such, the development of airfoil structures that use coolant more efficiently while also reducing stress caused by imbalanced thermal expansion between internal and external regions remains a significant technological industry objection.

BRIEF DESCRIPTION OF THE INVENTION

The present application thus describes a turbine blade that includes an airfoil defined by a concave shaped pressure side outer wall and a convex shaped suction side outer wall that connect along leading and trailing edges and, therebetween, form a radially extending chamber for receiving the flow of a coolant. The turbine blade may further include a rib configuration that partitions the chamber into radially extending flow passages, and a blade outer shell that defines an outer surface of the airfoil. The rib configuration is a non-integral component to the blade outer shell.

The present invention further describes a method of manufacturing a turbine blade that includes an airfoil defined by a concave shaped pressure side outer wall and a convex shaped suction side outer wall that connect along leading and trailing edges and, therebetween, form a radially extending chamber for receiving the flow of a coolant. The method may include the steps of: separately forming a blade outer shell and a rib insert, wherein each of the blade outer shell and the rib insert comprise integrally formed components, and the blade outer shell includes an opening through which the rib insert inserts during installation; and inserting the rib insert through the opening and attaching the rib insert to an interior surface of the blade outer shell. The rib insert may include a configuration that partitions the chamber of the airfoil into radially extending flow passages, and includes a camber line rib having a wavy profile.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which:

FIG. 8 is a side view of a shell of a rotor blade according to an embodiment of the present invention; and FIG. 9 is a cross-sectional view of a turbine rotor blade having a nonintegral shell and an insert according to an embodiment of the present invention.

DETAILED DESCRIPTION OF THE INVENTION

Figure 1:
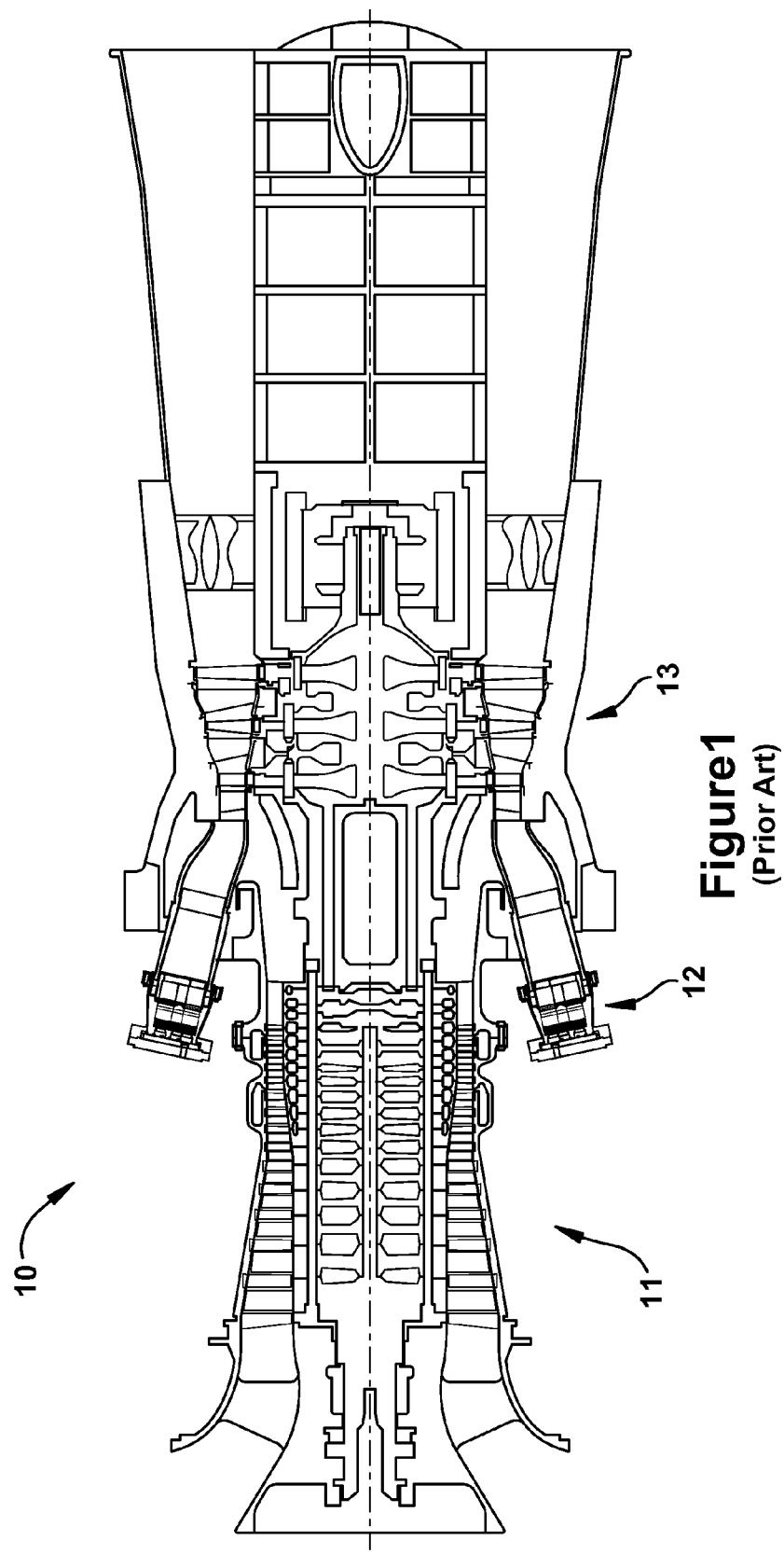
FIG. 1 is a schematic representation of an exemplary turbine engine in which certain embodiments of the present application may be used.

As an initial matter, in order to clearly describe the current invention it will become necessary to select certain terminology when referring to and describing relevant machine components within a gas turbine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part. Accordingly, in understanding the scope of the present invention, attention should not only be paid to the terminology and description provided herein, but also to the structure, configuration, function, and/or usage of the component.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft", without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

By way of background, referring now to the figures, FIGS. 1 through 4 illustrate an exemplary combustion turbine engine in which embodiments of the present application may be used. It will be understood by those skilled in the art that the present invention is not limited to this particular type of usage. The present invention may be used in combustion turbine engines, such as those used in power generation, airplanes, as well as other engine types. The examples provided are not meant to be limiting unless otherwise stated.

FIG. 1 is a schematic representation of a combustion turbine engine 10. In general, combustion turbine engines operate by extracting energy from a pressurized flow of hot gas produced by the combustion of a fuel in a stream of compressed air. As illustrated in FIG. 1, combustion turbine engine 10 may be configured with an axial compressor 11 that is mechanically coupled by a common shaft or rotor to a downstream turbine section or turbine 13, and a combustor 12 positioned between the compressor 11 and the turbine 13.

Figure 2:
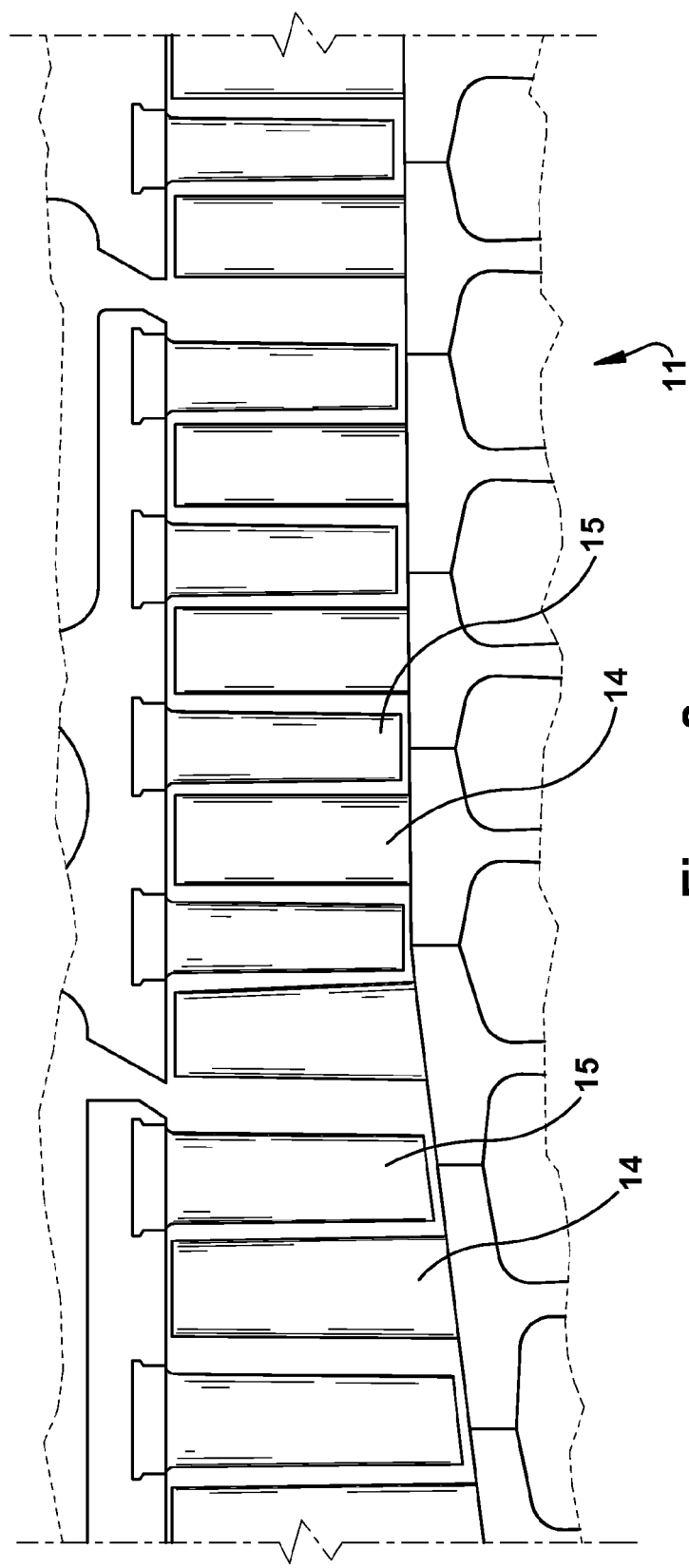
FIG. 2 is a sectional view of the compressor section of the combustion turbine engine of FIG. 1.

FIG. 2 illustrates a view of an exemplary multi-staged axial compressor 11 that may be used in the combustion turbine engine of FIG. 1. As shown, the compressor 11 may include a plurality of stages. Each stage may include a row of compressor rotor blades 14 followed by a row of compressor stator blades 15. Thus, a first stage may include a row of compressor rotor blades 14, which rotate about a central shaft, followed by a row of compressor stator blades 15, which remain stationary during operation.

Figure 3:
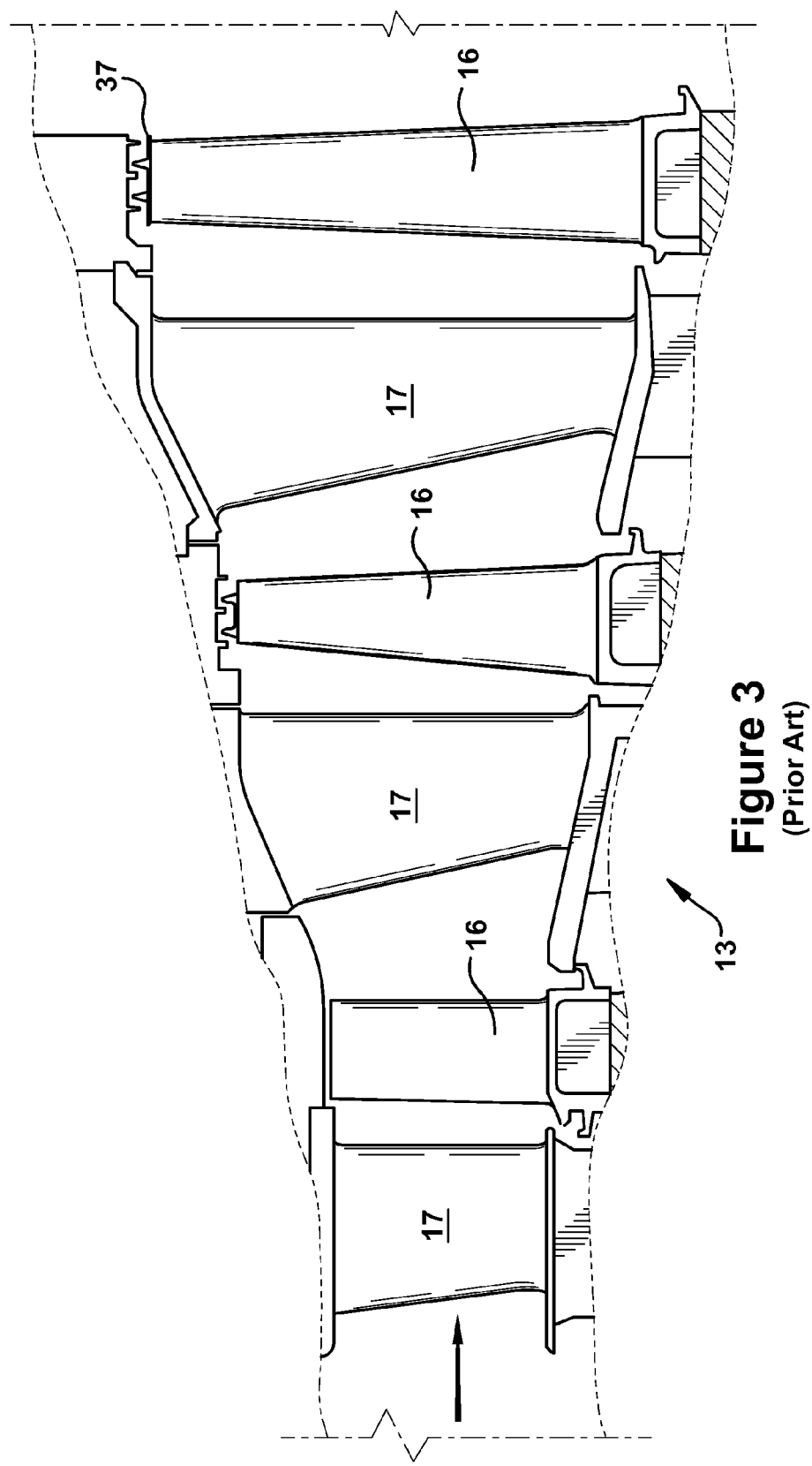
FIG. 3 is a sectional view of the turbine section of the combustion turbine engine of FIG. 1.

FIG. 3 illustrates a partial view of an exemplary turbine section or turbine 13 that may be used in the combustion turbine engine of FIG. 1. The turbine 13 may include a plurality of stages. Three exemplary stages are illustrated, but more or less stages may be present in the turbine 13. A first stage includes a plurality of turbine buckets or turbine rotor blades 16, which rotate about the shaft during operation, and a plurality of nozzles or turbine stator blades 17, which remain stationary during operation. The turbine stator blades 17 generally are circumferentially spaced one from the other and fixed about the axis of rotation. The turbine rotor blades 16 may be mounted on a turbine wheel (not shown) for rotation about the shaft (not shown). A second stage of the turbine 13 also is illustrated. The second stage similarly includes a plurality of circumferentially spaced turbine stator blades 17 followed by a plurality of circumferentially spaced turbine rotor blades 16, which are also mounted on a turbine wheel for rotation. A third stage also is illustrated, and similarly includes a plurality of turbine stator blades 17 and rotor blades 16. It will be appreciated that the turbine stator blades 17 and turbine rotor blades 16 lie in the hot gas path of the turbine 13. The direction of flow of the hot gases through the hot gas path is indicated by the arrow. As one of ordinary skill in the art will appreciate, the turbine 13 may have more, or in some cases less, stages than those that are illustrated in FIG. 3. Each additional stage may include a row of turbine stator blades 17 followed by a row of turbine rotor blades 16.

In one example of operation, the rotation of compressor rotor blades 14 within the axial compressor 11 may compress a flow of air. In the combustor 12, energy may be released when the compressed air is mixed with a fuel and ignited. The resulting flow of hot gases from the combustor 12, which may be referred to as the working fluid, is then directed over the turbine rotor blades 16, the flow of working fluid inducing the rotation of the turbine rotor blades 16 about the shaft. Thereby, the energy of the flow of working fluid is transformed into the mechanical energy of the rotating blades and, because of the connection between the rotor blades and the shaft, the rotating shaft. The mechanical energy of the shaft may then be used to drive the rotation of the compressor rotor blades 14, such that the necessary supply of compressed air is produced, and also, for example, a generator to produce electricity.

Figure 4:
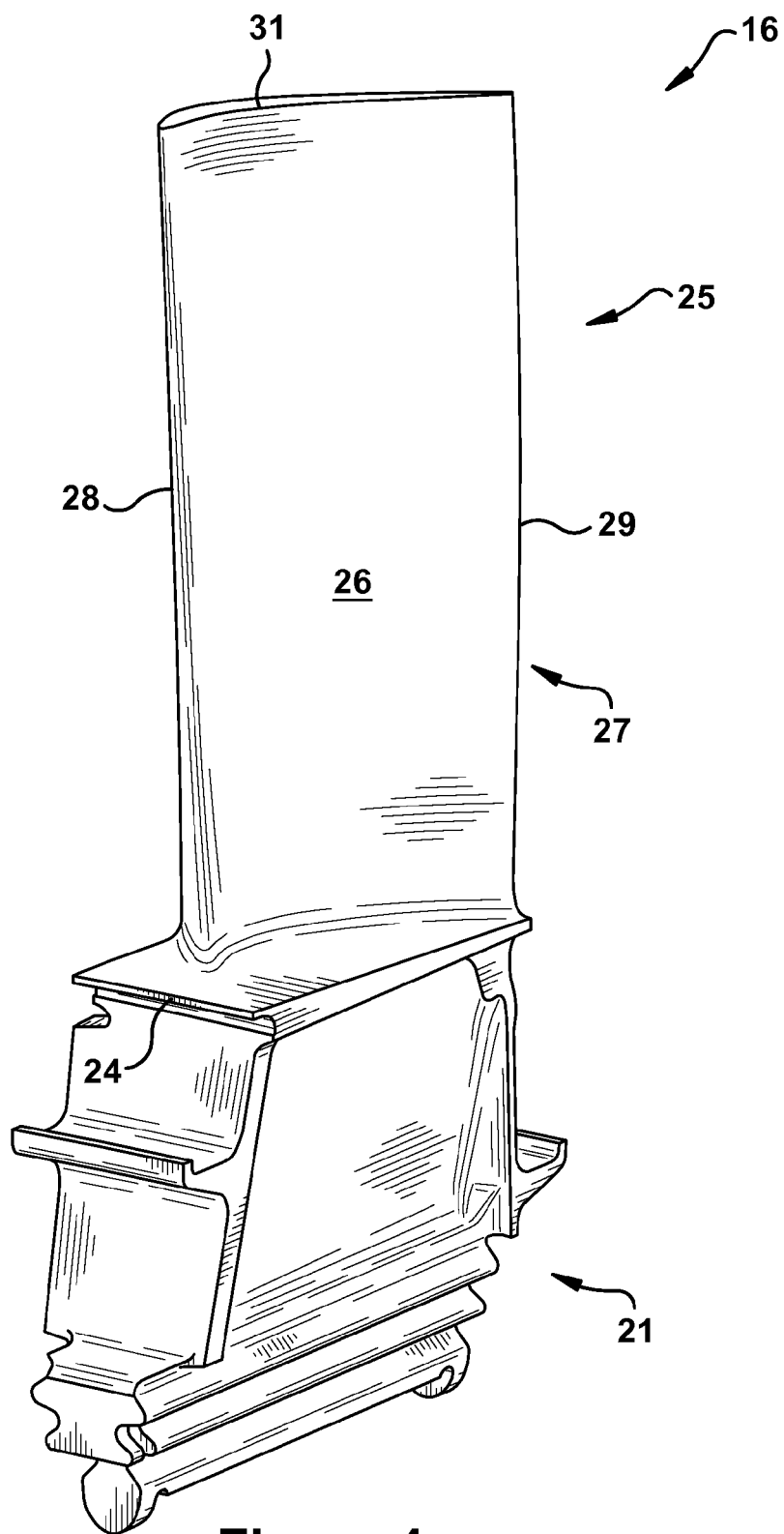
FIG. 4 is a perspective view of a turbine rotor blade of the type in which embodiments of the present invention may be employed.

FIG. 4 is a perspective view of a turbine rotor blade 16 of the type in which embodiments of the present invention may be employed. The turbine rotor blade 16 includes a root 21 by which the rotor blade 16 attaches to a rotor disc. The root 21 may include a dovetail configured for mounting in a corresponding dovetail slot in the perimeter of the rotor disc. The root 21 may further include a shank that extends between the dovetail and a platform 24, which is disposed at the junction of the airfoil 25 and the root 21 and defines a portion of the inboard boundary of the flow path through the turbine 13. It will be appreciated that the airfoil 25 is the active component of the rotor blade 16 that intercepts the flow of working fluid and induces the rotor disc to rotate. While the blade of this example is a turbine rotor blade 16, it will be appreciated that the present invention also may be applied to other types of blades within the turbine engine 10, including turbine stator blades 17. It will be seen that the airfoil 25 of the rotor blade 16 includes a concave pressure side outer wall 26 and a circumferentially or laterally opposite convex suction side outer wall 27 extending axially between opposite leading and trailing edges 28, 29 respectively. The sidewalls 26 and 27 also extend in the radial direction from the platform 24 to an outboard tip 31. (It will be appreciated that the application of the present invention may not be limited to turbine rotor blades, but may also be applicable to stator blades. The usage of rotor blades in the several embodiments described herein is exemplary unless otherwise stated.)

Figure 5:
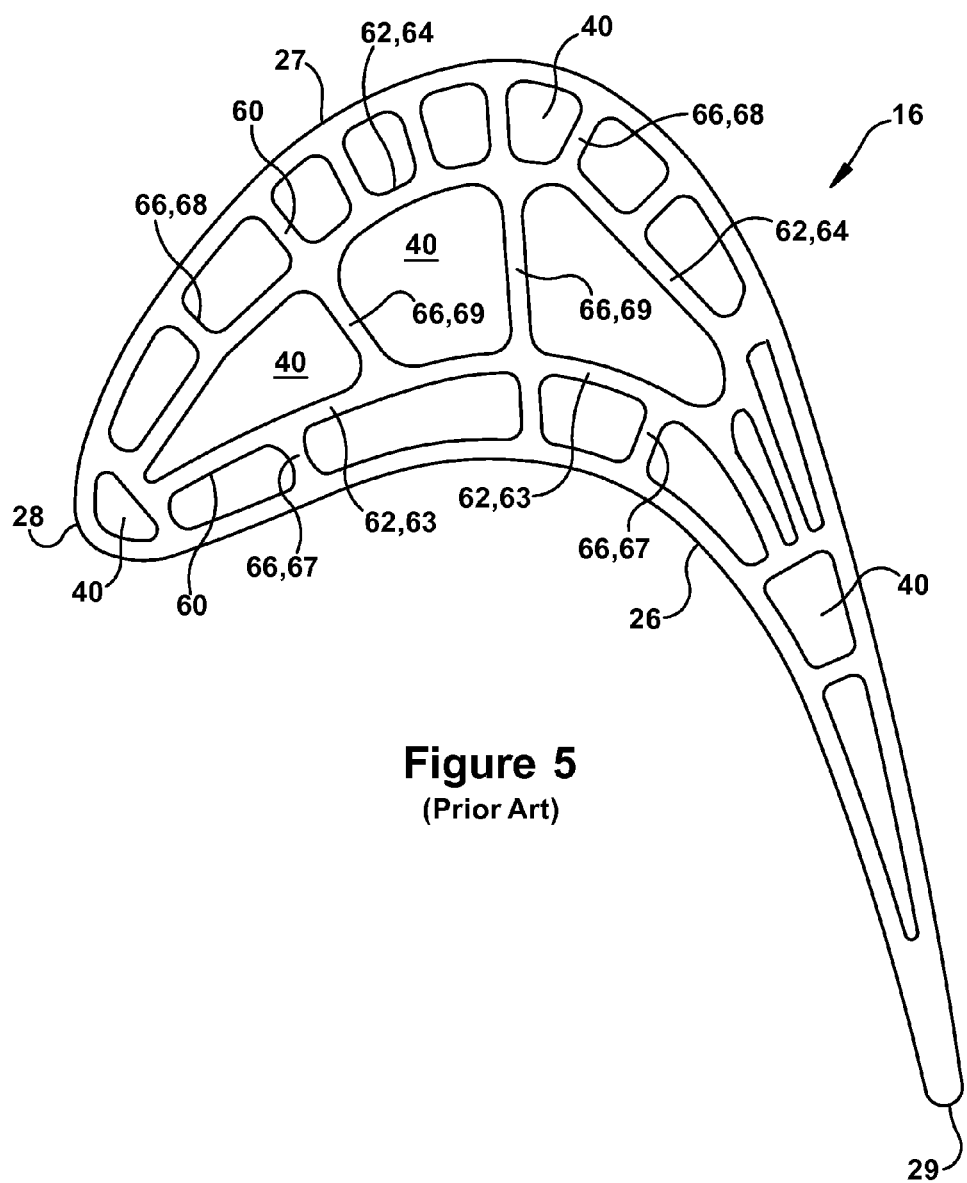
FIG. 5 is a cross-sectional view of a turbine rotor blade having an inner wall or rib configuration according to conventional design.

FIG. 5 shows an internal wall construction as may be found in a rotor blade airfoil 25 having a conventional design. As indicated, the outer surface of the airfoil 25 may be defined by a relatively thin pressure side outer wall 26 and suction side outer wall 27, which may be connected via a plurality of radially extending and intersecting ribs 60. The ribs 60 are configured to provide structural support to the airfoil 25, while also defining a plurality of radially extending and substantially separated flow passages 40. Typically the ribs 60 extend radially so to partition the flow passages over much of the radial height of the airfoil 25, but, as discussed more below, the flow passage may be connected along the periphery of the airfoil so to define a cooling circuit. That is, the flow passages 40 may fluidly communicate at the outboard or inboard edges of the airfoil 25, as well as via a number of smaller crossover passages or impingement apertures (not shown) that may be positioned therebetween. In this manner certain of the flow passages 40 together may form a winding or serpentine cooling circuit. Additionally, film cooling ports (not shown) may be included that provide outlets through which coolant is released from the flow passages 40 onto the outer surface of the airfoil 25.

The ribs 60 may include two different types, which then, as provided herein, may be subdivided further. A first type, a camber line rib 62, is typically a lengthy rib that extends in parallel or approximately parallel to the camber line of the airfoil, which is a reference line stretching from the leading edge 28 to the trailing edge 29 that connects the midpoints between the pressure side outer wall 26 and the suction side outer wall 27. As is often the case, the conventional configuration of FIG. 5 includes two camber line ribs 62, a pressure side camber line rib 63, which also may be referred to as the pressure side inner wall given the manner in which it is offset from and close to the pressure side outer wall 26, and a suction side camber line rib 64, which also may be referred to as the suction side inner wall given the manner in which it is offset from and close to the suction side outer wall 27. As mentioned, this type of design is often referred to as having a "four-wall" configuration due to the prevalent four main walls that include the two sidewalls 26, 27 and the two camber line ribs 63, 64. It will be appreciated that the outer walls 26, 27 and the camber line ribs 62 are cast as integral components.

The second type of rib is referred to herein as a traverse rib 66. Traverse ribs 66 are the shorter ribs that are shown connecting the walls and inner ribs of the four-wall configuration. As indicated, the four walls may be connected by a number of the traverse ribs 66, which may be further classified according to which of the walls each connects. As used herein, the traverse ribs 66 that connect the pressure side outer wall 26 to the pressure side camber line rib 63 are referred to as pressure side traverse ribs 67. The traverse ribs 66 that connect the suction side outer wall 27 to the suction side camber line rib 64 are referred to as suction side traverse ribs 68. Finally, the traverse ribs 66 that connect the pressure side camber line rib 63 to the suction side camber line rib 64 are referred to as center traverse ribs 69.

In general, the purpose of four-wall internal configuration in an airfoil 25 is to provide efficient near-wall cooling, in which the cooling air flows in channels adjacent to the outer walls 26, 27 of the airfoil 25. It will be appreciated that near-wall cooling is advantageous because the cooling air is in close proximity of the hot outer surfaces of the airfoil, and the resulting heat transfer coefficients are high due to the high flow velocity achieved by restricting the flow through narrow channels. However, such designs are prone to experiencing low cycle fatigue due to differing levels of thermal expansion experienced within the airfoil 25, which, ultimately, may shorten the life of the rotor blade. For example, in operation, the suction side outer walls 27 thermally expands more than the suction side camber line rib 64. This differential expansion tends to increase the length of the camber line of the airfoil 25, and, thereby, causes stress between each of these structures as well as those structures that connect them. In addition, the pressure side outer wall 26 also thermally expands more than the cooler pressure side camber line rib 63. In this case, the differential tends to decrease the length of the camber line of the airfoil 25, and, thereby, cause stress between each of these structures as well as those structures that connect them. The oppositional forces within the airfoil that, in the one case, tends to decrease the airfoil camber line and, in the other, increase it, can lead to further stress concentrations. The various ways in which these forces manifest themselves given an airfoil's particular structural configuration and the manner in which the forces are then balanced and compensated for becomes a significant determiner of the part life of the rotor blade 16.

More specifically, in a common scenario, the suction side outer wall 27 tends to bow outward at the apex of its curvature as exposure to the high temperatures of the hot gas path cause it to thermally expand. It will be appreciated that the suction side camber line rib 64, being an internal wall, does not experience the same level of thermal expansion and, therefore, does not have the same tendency to bow outward. The camber line rib 64 then resists the thermal growth of the outer wall 27. Because conventional designs have camber line ribs 62 formed with stiff geometries that provide little or no compliance, this resistance and the stress concentrations that result from it can be substantial. Exacerbating the problem, the traverse ribs 66 used to connect the camber line rib 62 to the outer wall 27 are formed with linear profiles and generally oriented at right angles in relation to the walls that they connect. This being the case, the traverse ribs 66 operate to basically hold fast the "cold" spatial relationship between the outer wall 27 and the camber line rib 64 as the heated structures expand at significantly different rates. Accordingly, with little or no "give" built into the structure, conventional arrangements are ill-suited at defusing the stress that concentrates in certain regions of the structure. The differential thermal expansion bus results in low cycle fatigue issues that shorten component life.

Many different internal airfoil cooling systems and structural configurations have been evaluated in the past, and attempts have been made to rectify this issue. One such approach proposes overcooling the outer walls 26, 27 so that the temperature differential and, thereby, the thermal growth differential are reduced. It will be appreciated, though, that the way in which this is typically accomplished is to increase the amount of coolant circulated through the airfoil. Because coolant is typically air bled from the compressor, its increased usage has a negative impact on the efficiency of the engine and, thus, is a solution that is preferably avoided. Other solutions have proposed the use of improved fabrication methods and/or more intricate internal cooling configurations that use the same amount of coolant, but use it more efficiently. While these solutions have proven somewhat effective, each brings additional cost to either the operation of the engine or the manufacture of the part, and does nothing to directly address the root problem, which is the geometrical deficiencies of conventional design in light of how airfoils grow thermally during operation.

The present invention generally teaches certain curving or bubbled or sinusoidal or wavy internal ribs (hereinafter "wavy ribs") that alleviate imbalanced thermal stresses that often occur in the airfoil of turbine blades. Within this general idea, the present application describes several ways in which this may be accomplished, which include wavy camber line ribs 62 and/or traverse ribs 66, as well as certain types of angled connections therebetween. It will be appreciated that these novel configurations—which, as delineated in the appended claims, may be employed separately or in combination—reduce the stiffness of the internal structure of the airfoil 25 so to provide targeted flexibility by which stress concentrations are dispersed and strain off-loaded to other structural regions that are better able to withstand it. This may include, for example, off-loading to a region that spreads the strain over a larger area, or, perhaps, structure that offloads tensile stress for a compressive load, which is typically more preferable. In this manner, life-shortening stress concentrations and strain may be avoided.

Figure 6:
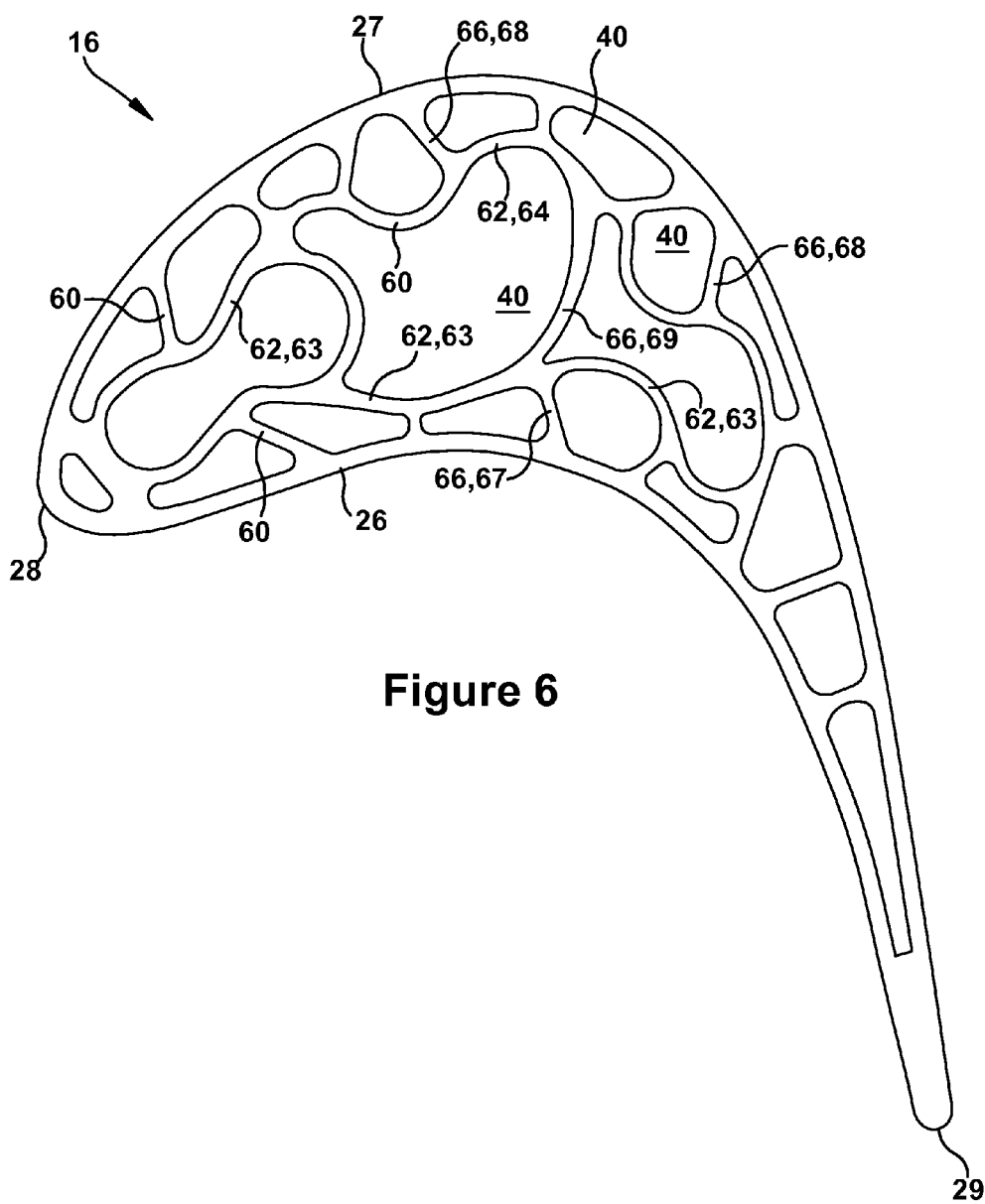
FIG. 6 is a cross-sectional view of a turbine rotor blade having an inner wall configuration according to an embodiment of the present invention.
Figure 7:
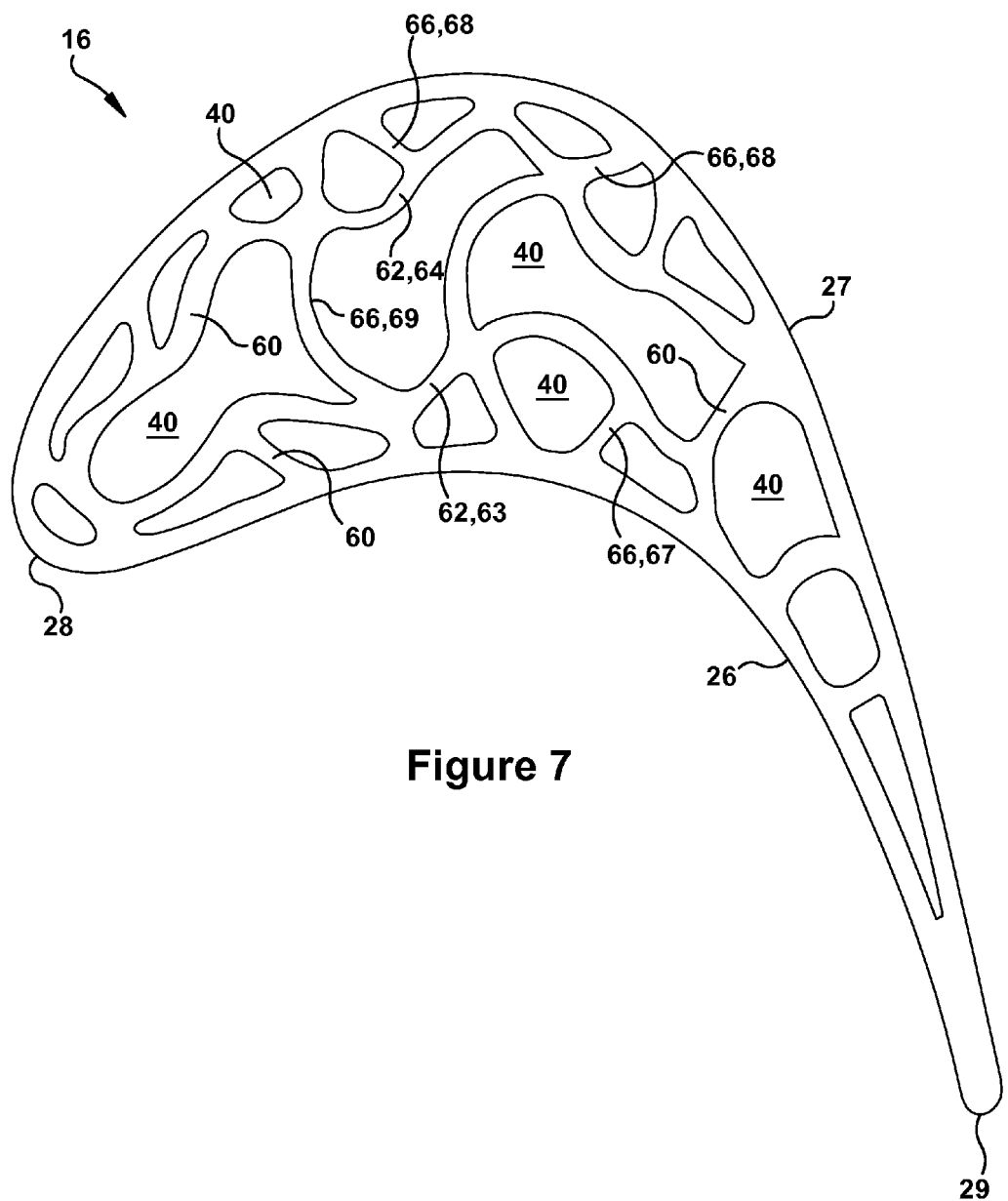
FIG. 7 is a cross-sectional view of a turbine rotor blade having an inner wall or rib configuration according to an alternative embodiment of the present invention.

FIGS. 6 and 7 provide cross-sectional views of a turbine rotor blade 16 having an inner wall configuration according to embodiments of the present invention. Specifically, the present invention involves the configuration of ribs 60 that are typically used as both structural support as well as partitions that divide hollow airfoils 25 into substantially separated radially extending flow passages 40 that may be interconnects as desired to create cooling circuits. These flow passages 40 and the circuits they form are used to direct a flow of coolant through the airfoil 25 in a particular manner so that its usage is targeted and more efficient. Though the examples provided herein are shown as they might be used in a turbine rotor blades 16, it will be appreciated that the same concepts also may be employed in turbine stator blades 17. In one embodiment, the rib configuration of the present invention includes a camber line rib 62 having a wavy profile. (As used herein, the term "profile" is intended to refer to the shape the ribs have in the cross-sectional views of FIGS. 6 through 8.) A camber line rib 62, as described above, is one of the longer ribs that typically extend from a position near the leading edge 28 of the airfoil 25 toward the trailing edge 29. These ribs are referred to as "camber line ribs" because the path they trace is approximately parallel to the camber line of the airfoil 25, which is a reference line extending between the leading edge 28 and the trailing edge 29 of the airfoil 25 through a collection of points that are equidistant between the concave pressure side outer wall 26 and the convex suction side outer wall 27. According to the present application, a "wavy profile" includes one that is noticeably curved and sinusoidal in shape, as indicated. In other words, the "wavy profile" is one that presents a back-and-forth "S" profile. Examples of this particular type of wavy profile are provided above FIGS. 6 and 7.

The segment or length of the camber line rib 62 that is configured with the wavy profile may vary depending on design criteria. In the provided examples the wavy camber line rib 62 typically stretches from a position near the leading edge 28 of the airfoil 25 to a position that is beyond the midpoint of the camber line of the airfoil 25. It will be appreciated that the wavy portion of the camber line rib 62 may be shorter in length while still providing the same types of performance advantages discussed herein. The number of curves as well as the length of the wavy segment of the camber line rib 62 may be varied to achieve the best results. In certain embodiments, the wavy camber line rib 62 of the present invention is defined by the number of complete back-and-forth "S" shapes it contains. In a preferred embodiment of this type, the wavy camber line rib 62 includes at least one continuous back-and-forth "S" shape. In another embodiment, the wavy camber line rib 62 includes at least two consecutive and continuous back-and-forth "S" shapes. It will be appreciated that the examples provided in FIGS. 6 and 7 each trace paths having more than two full "S" shapes. In regard to overall length, the wavy segment of the camber line rib 62 may extend for a substantial portion of the length of the camber line of the airfoil 25. For example, as shown in FIGS. 6 and 7, in a preferred embodiment, the wavy portion of the camber line rib 62 is over 50% of the length of the camber line of the airfoil 25. In other words, the wavy portion of the camber line rib 62 originates near the leading edge 28 of the airfoil 25 and extend rearward and well beyond the apex of the curvature of the airfoil 25. It will be appreciated that shorter lengths also may be employed with performance benefits, such as wavy portions of at least 25% length of the camber line rib 62.

It will be appreciated that, given its winding profile, a wavy camber line rib 62 traces a path that varies in its directional heading. The wavy camber line rib 62 of the present invention may still be described as having a general arcing path across which it winds, and that this path typically extends from an origination point near the leading edge 28 and a trailing point near the trailing edge 29 of the airfoil 25. It will be appreciated that, in the case of a wavy camber line rib 62, it is this general arcing path that is roughly parallel to the camber line of the airfoil 25.

Many known airfoil 25 configurations, such as the four-wall example of FIG. 5 discussed above, include two camber line ribs 62. This type of configuration may be described as having a pressure side camber line rib 63 that resides nearer the pressure side outer wall 26, and a suction side camber line rib 64 that resides nearer the suction side outer wall 27. The present invention, as shown in FIGS. 6 and 7, may include configurations in which both the suction side camber line rib 64 and the pressure side camber line rib 63 are formed as wavy ribs. In alternative embodiments, only one of these camber line ribs 62 may have a wavy profile. It will be appreciated that the present invention may also be employed in configurations having only a single camber line rib 62.

In airfoils 25 that include two camber line ribs 62, it will be appreciated that the pressure side camber line rib 63 and the suction side camber line rib 64 define a center flow passage 40. The wavy profile for each of the pressure side camber line rib 63 and the suction side camber line rib 64 may be defined relative to the shape taken by successive segments of the camber line rib 62 facing center flow passage 40. That is, for example, relative to the central flow passage 40, the wavy profile of the camber line rib 62 may be described as including two successive segments in which a first concave segment transitions to a second convex segment. In an alternative embodiment, the wavy profile may include four or more successive segments in which: a first concave segment transitions to a second convex segment; the second convex segment transitions to a third concave segment; and the third concave segment transitions to a fourth convex segment.

Thus, according to the present invention, the internal structure of an airfoil may include wavy ribs along the camber line direction of the airfoil. By making the camber line rib 62 into a spring in this way, the internal backbone of the airfoil may be made more compliant so that performance advantages may be achieved. In addition, the traverse ribs of the airfoil structure may be curved so to further soften the load path, as well as making more compliant connections with the ribs 62 and outer walls 26, 27 that they connect. Whereas standard linear rib designs experience high stress and low cyclic life due to the thermal fight between the internal cooling cavity walls and the much hotter outer walls, the present invention provides a spring-like construction that is better able to disburse stress concentrations, which, as provided herein, may be used to improve the life of the component.

Turning to another aspect of the present invention, FIG. 8 is a side view of a blade outer shell 100 of a rotor blade 16 according to an embodiment of the present invention. FIG. 9 is a cross-sectional view of the blade outer shell 100 in which a nonintegral rib configuration or rib insert 101 is installed according to an exemplary embodiment of the present invention. As described below, the present invention involves novel blade assemblies and methods of manufacturing such assemblies that yield more efficient coolant usage as well as the pairing of different materials within a multipart blade assembly so that the blade may be tuned toward expected thermal gradients and perform better when those gradients are imbalanced across the internal and external regions of the airfoil. Additionally, the two-part construction taught by the present invention may result in blade cost reductions by enabling the usage of lower-cost materials in less stressed regions, while also maintaining the usage of more expensive and resilient materials where necessary.

Typically highly stressed hot gas path turbine components, such as rotor and stator blades, are made from metal alloys selected for their resilience and ability to withstand extreme temperatures and mechanical loads. While certain of these components may still be made from steel alloys, with the ever-increasing firing temperatures of present day engines, the most demanding components, such as rotor blades, are usually constructed as an integrally formed single-part component from any number of superalloys, which are typically classified for their base alloying element, i.e., usually nickel, cobalt, or nickel-iron. The development of superalloys as relied heavily on both chemical and process innovations and has been driven primarily by the aerospace and power industries. It will be appreciated that superalloys display superior mechanical properties and their usage is widespread because of that. However, these materials are expensive and drive the cost of turbine applications higher. Examples of superalloys are Hastelloy, Inconel, Waspaloy, Rene alloys, Haynes alloys, Incoloy, MP98T, TMS alloys, and CMSX single crystal alloys.

Another material commonly used in hot gas path applications is ceramics, and much recent attention has been paid to these materials and their potential for increased usage in turbine engines. It will be appreciated that ceramic materials are known for their capability to withstand high temperatures. Additionally, ceramics are quite tolerant to contaminants such as sodium and vanadium which are present in low cost turbine fuels and highly corrosive to the commonly used nickel-base superalloys. Ceramics are also up to 40% lighter than comparable high temperature alloys, and they often cost much less. These types of materials include ceramics based on silicon carbide and silicon nitride that were identified many years ago. Though at present their usage in gas turbines is somewhat limited, continued technical progress in this area should enable more widespread use in the years to come, particularly given the recent advancement of ceramic-matric composites ("CMCs"). The introduction of CMCs into hot gas path components has long since been identified as a possible route toward the achievement of increasing operating temperatures without incurring the penalties associated with increased cooling air use. As discussed below, the present invention teaches ways in which turbine blades may be manufactured having multiple parts that include multiple materials. In this way, materials may be cost-effectively paired to satisfy the different criteria across separate regions of the turbine blade. This approach, for example, may enable the use of less expensive and/or lighter materials in place of costlier and heavier ones. It will also be appreciated that the present invention provides an efficient process by which turbine blades having a wavy or sinusoidal internal ribs may be manufactured. As one of ordinary skill in the art will appreciate, these types of configurations present difficulties when manufactured via traditional investment casting processes. The two-part approach to manufacturing the blades that is described herein and the subsequent connecting the parts via an installation process eliminates those difficulties and makes the casting of the blades more cost-effective.

Turning now to FIG. 8, a side view of a blade outer shell 100 is shown that defines an outer surface of the airfoil 25. Specifically, the blade outer shell 100 includes a shell chamber 105 having an inner surface 104 about which the pressure side outer wall 26 and the suction side outer wall 27 are defined. As illustrated, the blade outer shell 100 also may include a root portion 21, and defined through the root portion 21, a root opening 102. It will be appreciated that the root opening 102 may provide an opening through which a rib insert 101 is installed in the shell chamber 105.

According to embodiments of the present invention, the rib insert 101 is not an integrally formed component relative to the blade outer shell 100. That is, the rib insert 101 (or at least a portion thereof) is manufactured separately from the blade outer shell 100, and then the two parts are brought together and attached. While embodiments of the present invention anticipate cases in which the blade outer shell 100 and the rib insert 101 are manufactured separately from the same type of material, embodiments also include cases when the rib insert 101 is an integrally formed component made of a first type of material, and the blade outer shell 100 is an integrally formed component made of a second (and different) type of material. In one exemplary embodiment, the first type of material may be a first type of metal alloy, and the second type of material may be a second type of metal alloy. In another exemplary embodiment, the first type of material may be a metal alloy, and the second type of material may be a ceramic. Alternatively, in another exemplary embodiment, the first type of material may be ceramic, and the second type of material may be a metal alloy. Finally, in another embodiment, the first type of material may be a first type of ceramic, and the second type of material may be a second type of ceramic. It will be appreciated that the first material and the second material may be selected or paired together based on a thermal expansion characteristic of each. For example, this selection may anticipate expected thermal gradients during operation within the structure of the airfoil and then pair materials that, because of the different thermal expansion characteristics of the each, result in a reduced level of strain that otherwise would occur given the anticipated gradients.

As stated, the present invention also may be used to efficiently manufacture airfoils 25 that include camber line ribs 62 having a wavy profiles. The wavy profiles referenced here is meant to include any of those configurations discussed above relative to FIGS. 6 and 7. According to certain embodiments, the rib insert 101 may include several traverse ribs 66. The traverse ribs 66 may extend from a camber line rib 62 and be used to attach the rib insert 101 to the blade outer shell 100. Specifically, the traverse ribs 66 may include surfaces at distal ends of those traverse ribs 66 that connect to the inner surface 104 of the blade outer shell 100. At the point where the traverse ribs 66 touch the inner surface 104, a connection 106 between the rib insert 101 and the blade outer shell 100 may be made. The connection may include a weld. In other embodiments, the connection 106 may include a mechanical interference fit.

The present invention further includes a method of manufacturing a turbine blade. The method may include the step of separately forming a blade outer shell 100 and a rib insert 101. As stated, each of the blade outer shell 100 and the rib insert 101 may be separately formed as an integral component. The blade outer shell 100 may include an opening 102 through which the rib insert 101 inserts during installation. The second step of a process may include inserting the rib insert 101 through the opening 102 and attaching the rib insert 101 to an interior surface 104 of the blade outer shell 100. The rib insert 101 may include a configuration that partitions the chamber 105 of the airfoil 25 into radially extending flow passages 40. Additionally, the rib insert 101 may include a camber line rib 62 having a wavy profile pursuant to any of the configurations discussed above. An additional step of the method may include selecting the material from which each of the blade outer shell 100 and the rib insert 101 are made. The materials selected may include any of those discussed above, and the selection may be based upon a thermal expansion characteristic of each material relative to the other.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A turbine blade comprising an airfoil defined by a concave shaped pressure side outer wall and a convex shaped suction side outer wall that connect along leading and trailing edges and, therebetween, form a radially extending chamber for receiving the flow of a coolant, the turbine blade further comprising:
   a rib configuration that partitions the chamber into radially extending flow passages; and
   a blade outer shell that defines an outer surface of the airfoil;
   wherein the rib configuration comprising a non-integral component insertable during manufacture relative to the blade outer shell;
   wherein the rib configuration includes a camber line rib having a wavy profile;
   wherein the wavy profile comprises at least one back-and-forth "S" shape.

2. The turbine blade according to claim 1, wherein the rib configuration is an integrally formed component made of a first material; and
   wherein the blade outer shell is an integrally formed component made of a second material.

3. The turbine blade according to claim 2,
   wherein the turbine blade comprises one of a turbine rotor blade and a turbine stator blade.

4. The turbine blade according to claim 3, wherein the wavy profile comprises at least two consecutive back-and-forth "S" shapes; and
   wherein the turbine blade comprises a turbine rotor blade.

5. The turbine blade according to claim 3, wherein a camber line rib having a wavy profile comprises one that originates near the leading edge of the airfoil and winds back-and-forth across an arcing path that extends toward the trailing edge of the airfoil, the arcing path approximately parallel to a camber reference line of the airfoil; and
   wherein the arcing path of the camber line rib comprising a length that is at least 50% of a length of the camber reference line of the airfoil.

6. The turbine blade according to claim 5, wherein the rib configuration includes two camber line ribs in which a pressure side camber line rib comprise one residing near the pressure side outer wall, and a suction side camber line rib comprises one residing near the suction side outer wall, wherein both of the pressure side camber line rib and the suction side camber line rib comprise a wavy profile;
   wherein the pressure side camber line rib and the suction side camber line rib define a center flow passage therebetween; and
   wherein the wavy profile for each of the pressure side camber line rib and the suction side camber line rib comprises one that, relative to the central flow passage, includes at least two successive segments in which a first concave segment transitions to a second convex segment.

7. The turbine blade according to claim 4, wherein the rib configuration comprises traverse ribs; and
   wherein the traverse ribs extend from the camber line rib and include surfaces at distal ends that connect to the blade outer shell.

8. The turbine blade according to claim 3, wherein the first material comprises a first type of metal ahoy and the second material comprises a second type of metal away.

9. The turbine blade according to claim 3, wherein the first material comprises a metal alloy and the second material comprises a ceramic.

10. The turbine blade according to claim 3, wherein the first material comprises a ceramic and the second material comprises a metal alloy.

11. The turbine blade according to claim 3, wherein the first material comprises a first type of ceramic and the second material comprises a second type of ceramic.

12. The turbine blade according to claim 3, wherein the first material and the second material are selected based a thermal expansion characteristic of each.

13. The turbine blade according to claim 4, wherein the connection made between the rib configuration and the blade outer shell comprises a weld.

14. The turbine blade according to claim 4, wherein the connection made between the rib configuration and the blade outer shell comprises a mechanical interference fit.

15. The turbine blade according to claim 4, wherein the blade outer shell comprises a blade root that includes a platform from which the airfoil extends; and
wherein the blade outer she comprises an opening at an inboard side of the blade root, the opening being configured so to allow the insertion of the rib configuration therethrough during manufacture.

16. A method of manufacturing a turbine blade that includes an airfoil defined by a concave shaped pressure side outer wall and a convex shaped suction side outer wall that connect along leading and trailing edges and, therebetween, form a radially extending chamber for receiving the flow of a coolant, the method including the steps of:
separately forming a blade outer she and a rib insert, wherein each of the blade outer shell and the rib insert comprise integrally formed components, and the blade outer she includes an opening through which the rib insert inserts during installation;
inserting the rib insert through the opening and attaching the rib insert to an interior surface of the blade outer shell;
wherein the rib insert comprises a configuration that partitions the chamber of the airfoil into radially extending flow passages, and includes a camber line rib having a wavy profile.

17. The method of claim 16, wherein the camber line rib having a wavy profile comprises one that originates near the leading edge of the airfoil and winds back-and-forth across an arcing path that extends toward the trailing edge of the airfoil, the arcing path approximately parallel to a camber reference line of the airfoil, and wherein the wavy profile comprises at least one back-and-forth "S" shape;
wherein the arcing path of the camber line rib comprising a length that is at least 50% of a length of the camber reference line of the airfoil; and
wherein the turbine blade comprises a turbine rotor blade.

18. The method according to claim 17, wherein the rib insert comprises traverse ribs; and
wherein the traverse ribs extend from the camber line rib and include surfaces at distal ends, and the step of attaching the rib insert to the blade outer shell includes connecting the distal end surfaces of the rib insert to an interior surface of the chamber of the airfoil.

19. The method according to claim 17, wherein the rib insert comprises a first material and the blade outer shell comprises a second material that is different than the first material; and
wherein the first material comprises one of: a first type of metal alloy, a second type of metal alloy, a first type of ceramic, and a second type of ceramic; and
wherein the second material comprises one of: a first type of metal alloy, a second type of metal alloy, a first type of ceramic, and a second type of ceramic.

20. The method according to claim 17, further comprising the step of selecting the first material and the second material based upon a thermal expansion characteristic of each relative to the other.

* * * * *